United States Patent
Gadd et al.

(10) Patent No.: US 11,279,550 B2
(45) Date of Patent: Mar. 22, 2022

(54) DISPENSER

(71) Applicant: MARS, INCORPORATED, McLean, VA (US)

(72) Inventors: David Gadd, Chicago, IL (US); John MacDonald, Bristol (GB); Matthew Wright, Bath (GB); Duncan Colquhoun, Bristol (GB); Richard Donaldson, Cumbria (GB); Jake Dale-Brown, Leicester (GB)

(73) Assignee: MARS, INCORPORATED, McLean, VA (US)

( * ) Notice: Subject to any disclaimer, the term of this patent is extended or adjusted under 35 U.S.C. 154(b) by 0 days.

(21) Appl. No.: 16/484,158

(22) PCT Filed: Feb. 8, 2018

(86) PCT No.: PCT/GB2018/050351
§ 371 (c)(1),
(2) Date: Aug. 7, 2019

(87) PCT Pub. No.: WO2018/146475
PCT Pub. Date: Aug. 16, 2018

(65) Prior Publication Data
US 2020/0024062 A1  Jan. 23, 2020

(30) Foreign Application Priority Data

Feb. 9, 2017 (GB) ..................... 1702169

(51) Int. Cl.
*A47G 19/32*  (2006.01)
*B65D 83/04*  (2006.01)
*G01F 11/40*  (2006.01)

(52) U.S. Cl.
CPC ......... *B65D 83/0409* (2013.01); *A47G 19/32* (2013.01); *G01F 11/40* (2013.01)

(58) Field of Classification Search
CPC ...... B65D 83/0409; A47G 19/32; G01F 11/40
See application file for complete search history.

(56) References Cited

U.S. PATENT DOCUMENTS 4,991,748 A    2/1991  Hackmann et al.
7,073,685 B1 * 7/2006  Giraud ............... B65D 83/0409
                                                  221/260

(Continued)

FOREIGN PATENT DOCUMENTS

EP          0290972 A1   11/1988
WO       2009080309 A2    7/2009

*Primary Examiner* — Gene O Crawford
*Assistant Examiner* — Ayodeji T Ojofeitimi

(57) ABSTRACT

There is disclosed a dispenser 10 for dispensing product objects, comprising: a main chamber 20 for storing product objects; and a portion dispensing mechanism for dispensing a portion comprising a plurality of project objects 40. The portion dispensing mechanism comprises a gate arrangement 36 and a collection chamber 24 which are configured for relative linear movement between a loading configuration and a dispensing configuration. In the loading configuration a plurality of product objects 40 within the main chamber 20 collect within the collection chamber 24 and the gate arrangement 36 prevents product objects 40 from being dispensed from the collection chamber 24. In the dispensing configuration the gate arrangement 36 prevents product objects within the main chamber 20 from entering the collection chamber 24 and a plurality of product objects are dispensed from the collection chamber.

30 Claims, 8 Drawing Sheets

(56) References Cited

U.S. PATENT DOCUMENTS

Figure 1:
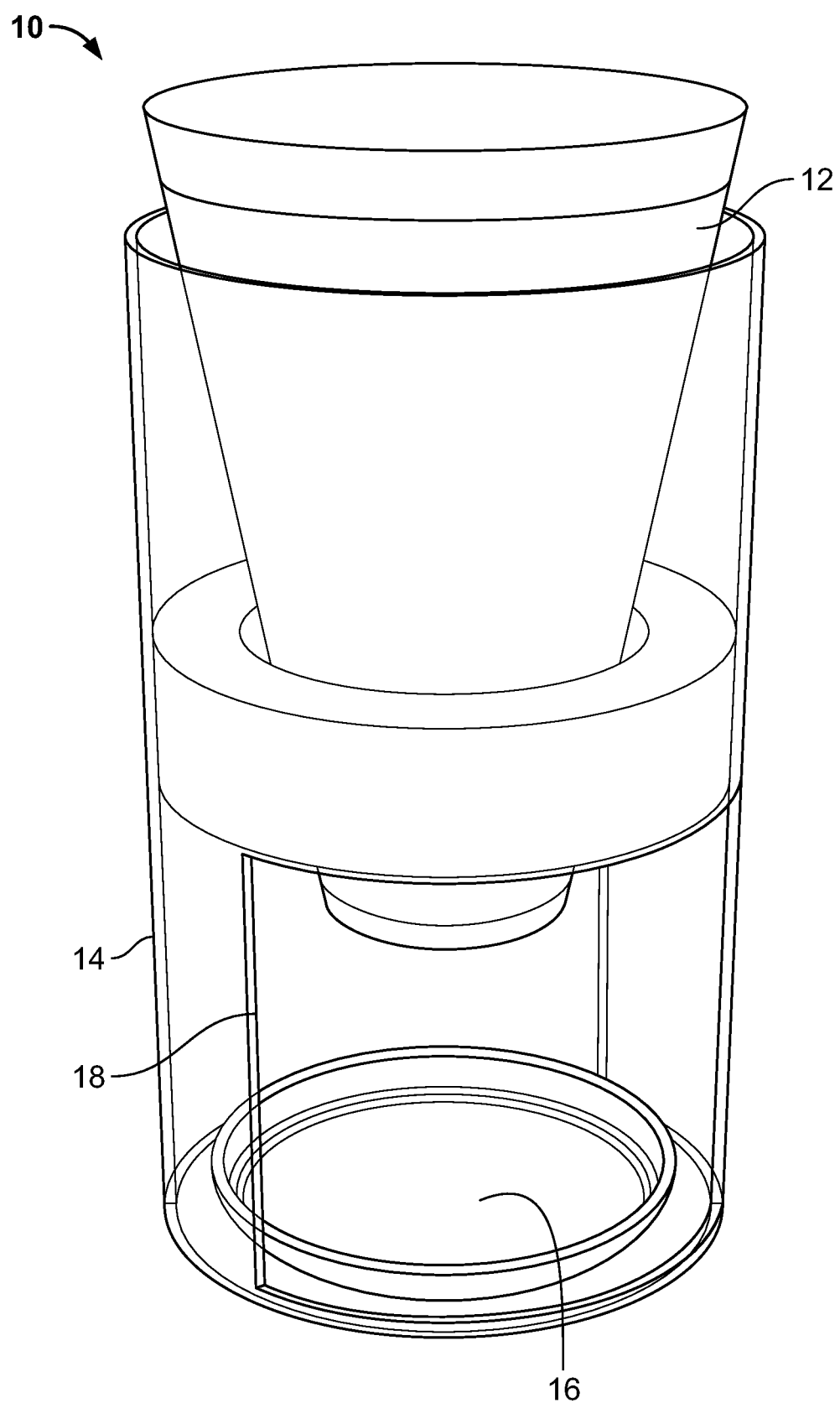

2003/0201277 A1* 10/2003 Baker ................ B65D 83/0409
221/266
2009/0194556 A1* 8/2009 Klein ................ B65D 83/0409
221/154

* cited by examiner

DISPENSER

The invention relates to a dispenser for dispensing product objects, such as confectionery pieces, candy pieces, chocolate pieces, pills, or tablets. In particular, although not exclusively, the invention relates to a confectionery dispenser for dispensing pieces of confectionery.

Many different types of dispenser exist for dispensing small product objects such as pieces of confectionery (e.g. candy pieces, chocolate pieces). One previously considered type of confectionery dispenser comprises a container having a flip top lid which can be opened to expose an opening of the container, and which can be closed to seal or close the opening. In order to dispense confectionery the flip top lid is opened and pieces of confectionery are typically tipped into the user's hand. Whilst such a dispenser may be satisfactory, it may be difficult to control the size of the portion dispensed.

It may therefore be desirable to provide an improved dispenser which may provide better control of dispensing.

According to an aspect there is provided a dispenser, such as a confectionery dispenser, for dispensing product objects, comprising: a main chamber for storing product objects; and a portion dispensing mechanism for dispensing a portion comprising a plurality of project objects, the portion dispensing mechanism comprising a gate arrangement and a collection chamber which are configured for relative linear movement between: a loading configuration in which in use a plurality of product objects within the main chamber collect within the collection chamber and the gate arrangement prevents product objects from being dispensed from the collection chamber; and a dispensing configuration in which in use the gate arrangement prevents product objects within the main chamber from entering the collection chamber and a plurality of product objects are dispensed from the collection chamber. The portion dispensing mechanism may provide better control of dispensing. The dispenser may be generally cylindrical.

The dispenser may further comprise a dispensing tray for receiving product objects dispensed from the collection chamber.

The dispenser may further comprise a main container which defines the main chamber and the collection chamber. The main container may be linearly moveable with respect to the gate arrangement so as to move the portion dispensing mechanism between the loading configuration and the dispensing configuration. The main container may define a dispensing outlet through which product objects from the collection chamber can be dispensed.

The dispenser may further comprise a secondary container within which a dispensing tray for receiving product objects dispensed from the collection chamber is provided. The dispensing tray may be defined by the secondary container. The dispensing tray may be removable from the secondary container. The dispensing tray may be integrally formed with or attached to the secondary container. The main container may be coupled to and linearly moveable with respect to the secondary container so as to move the portion dispensing mechanism between the loading configuration and the dispensing configuration. The main container and secondary container may be rotationally fixed such that no or limited relative rotation can occur between the two. The secondary container may define a dispensing chamber. An access opening may be provided in the secondary container which permits access to the dispensing tray. The main container may be at least partly received within and linearly moveable within the secondary container. The secondary container may define a base of the dispenser.

The gate arrangement (or divider or partition arrangement) may be coupled to the secondary container. The gate arrangement may be fixed to or integrally formed with the secondary container. The gate arrangement may comprise at least one gate element. The gate arrangement may comprise a plurality of gate elements. The gate arrangement may comprise a single gate element.

The dispenser may comprise an inlet guide provided for guiding product objects into the collection chamber when the portion dispensing mechanism is in the loading configuration. At least a part of the gate arrangement may form the inlet guide. The inlet guide may be in the form of a slope or ramp. The slope or ramp may be inclined (e.g. between 30-60°) with respect to the axis of the container.

The dispenser may further comprise an outlet guide for guiding product objects out of the collection chamber when the portion dispensing mechanism is in the dispensing configuration. The outlet guide may be in the form of a slope or ramp. The slope or ramp may be inclined (e.g. between 30-60°) with respect to the axis of the container.

The portion dispensing mechanism may be resiliently biased to the loading configuration. The portion dispensing mechanism may be resiliently biased to the loading configuration with a spring such as a coil spring. The portion dispensing mechanism may be lockable in the loading configuration and/or the dispensing configuration.

The main chamber may be provided with a loading opening so that product objects can be loaded into the main chamber. The dispenser may further comprise a closure member, such as a lid, for closing the loading opening.

The dispenser may be for dispensing product objects such as confectionery pieces, candy pieces, chocolate pieces, pills, or tablets.

According to another aspect there is provided a confectionery dispenser for dispensing a plurality of pieces of confectionery, comprising: a main container defining a main chamber for storing pieces of confectionery, a collection chamber for receiving a plurality of pieces of confectionery and a dispensing outlet for dispensing pieces of confectionery; a secondary container having a removable dispensing tray located therein for receiving pieces of confectionery dispensed through the dispensing outlet; a gate arrangement fixed with respect to the secondary container and comprising at least one gate element; wherein the main container is at least partly received within the secondary container and is linearly moveable with respect to the secondary container between: a loading position in which in use a plurality of pieces of confectionery collect within the collection chamber and are prevented from being dispensed through the dispensing outlet by the gate arrangement; and a dispensing position in which in use a plurality of pieces of confectionery are dispensed from the collection chamber through the dispensing outlet and pieces of confectionery are prevented from entering the collection chamber from the main chamber by the gate arrangement; and a biasing element which resiliently biases the main container to the loading position.

The invention may comprise any combination of the features and/or limitations referred to herein, except combinations of such features as are mutually exclusive.

Figure 2:
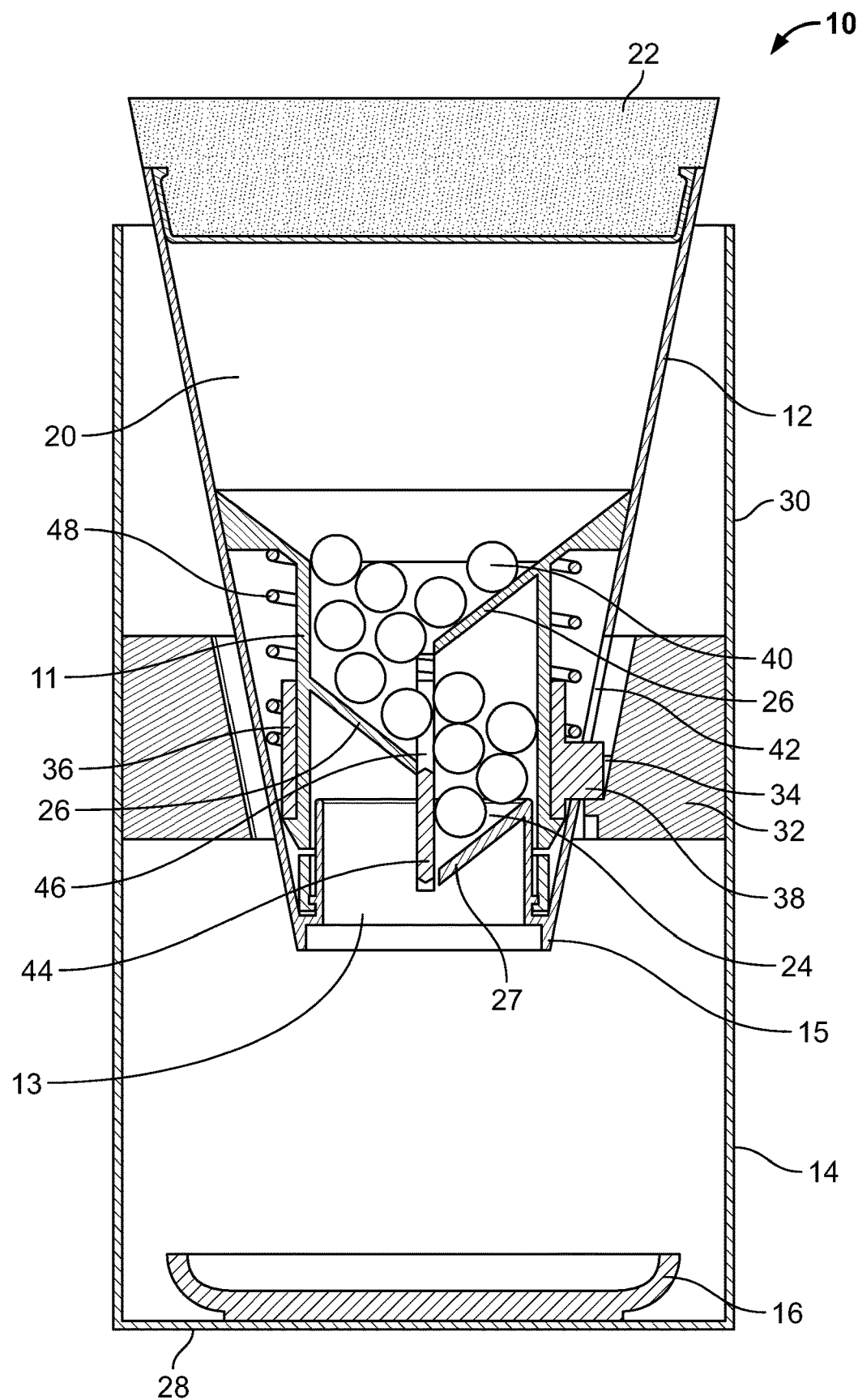
Figure 3:
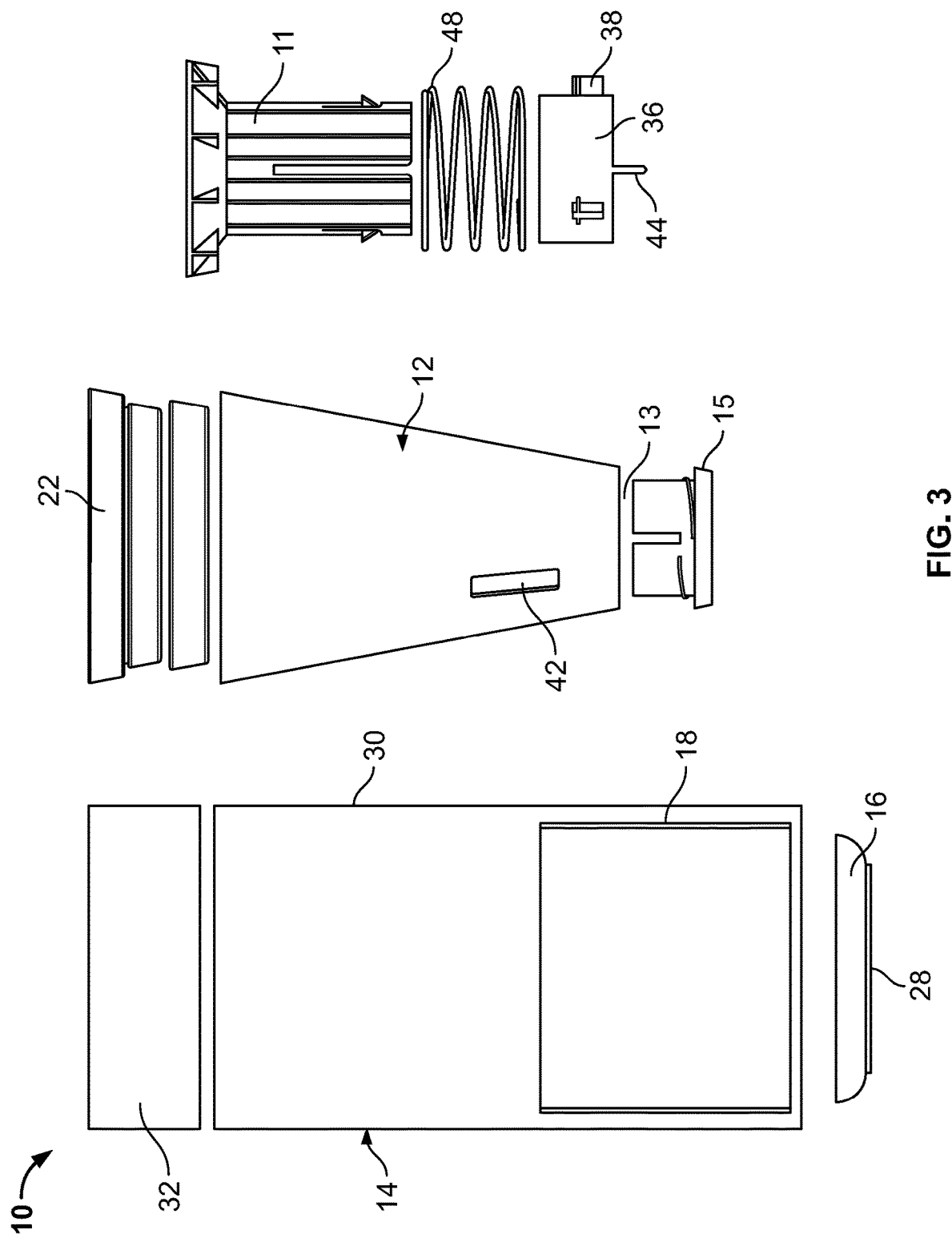
Figure 4:
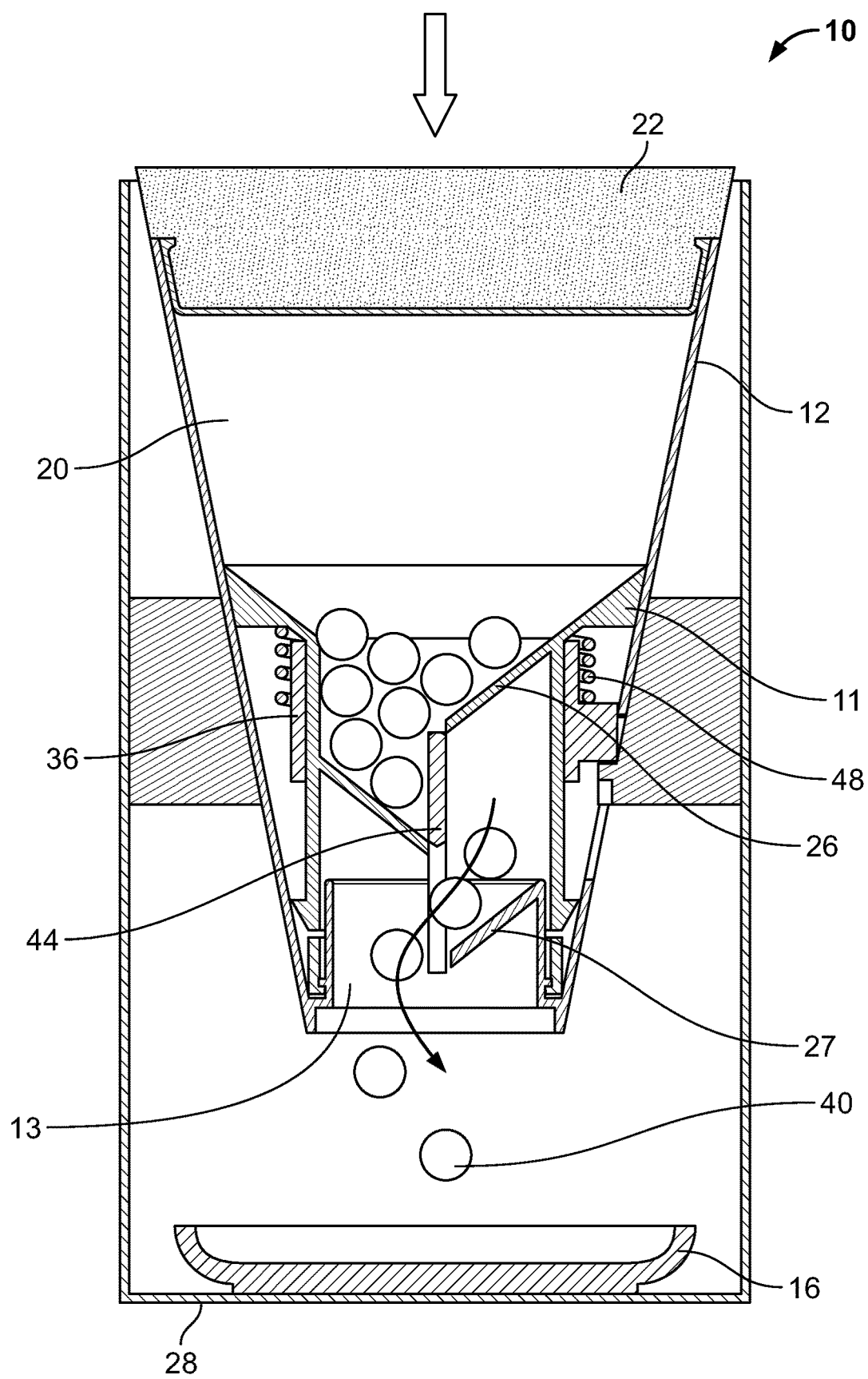
Figure 5:
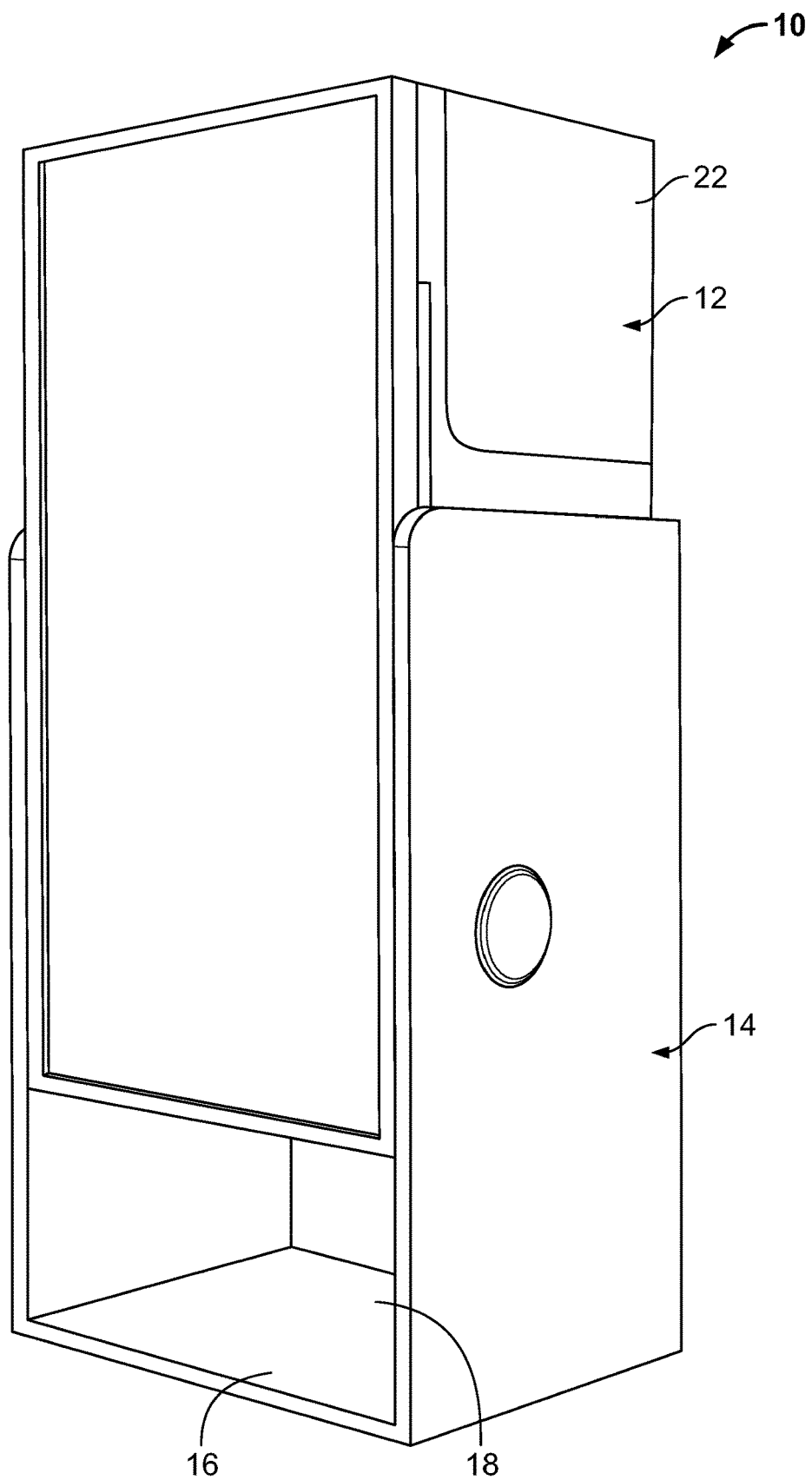
Figure 6:
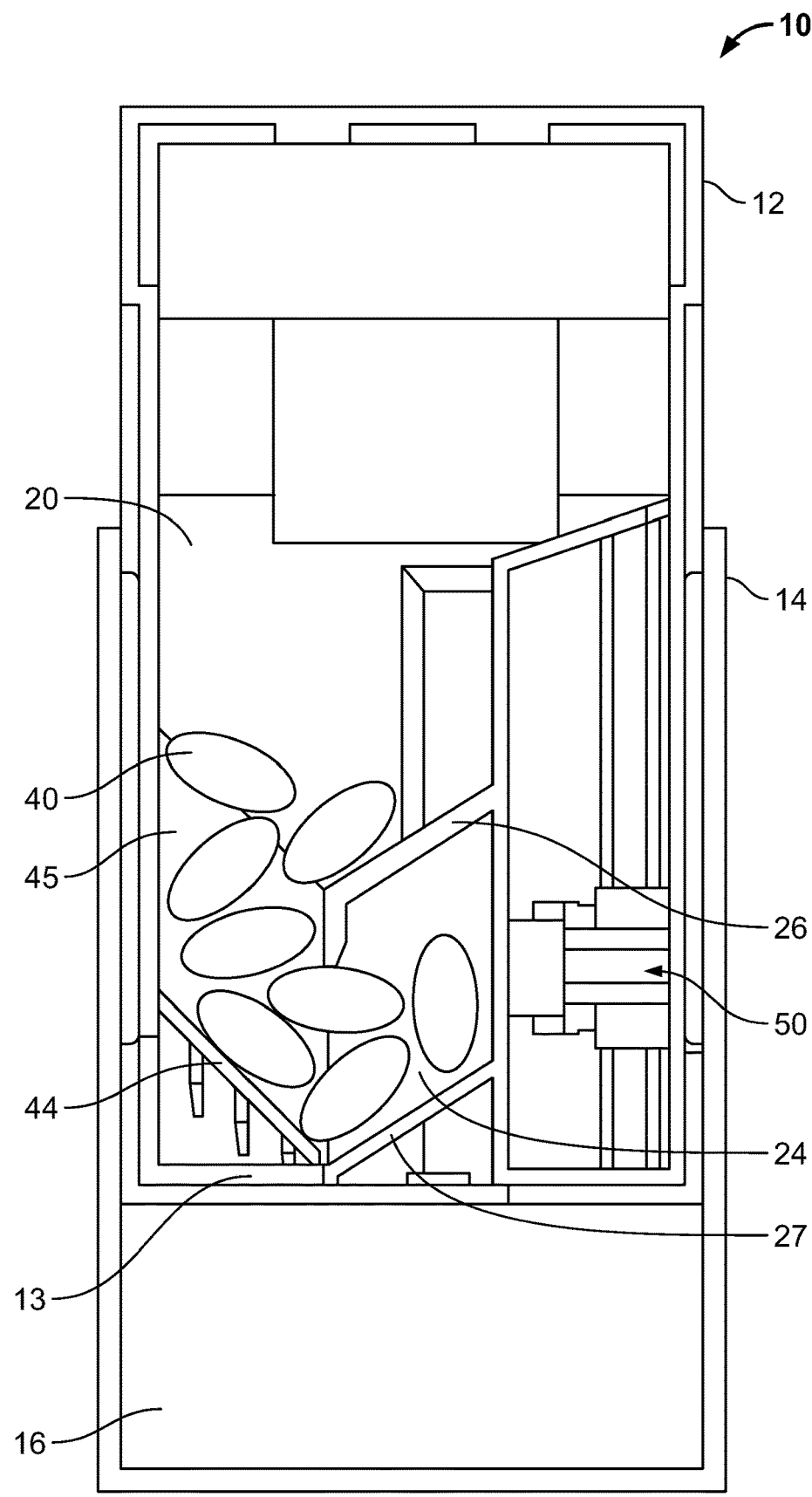
Figure 7:
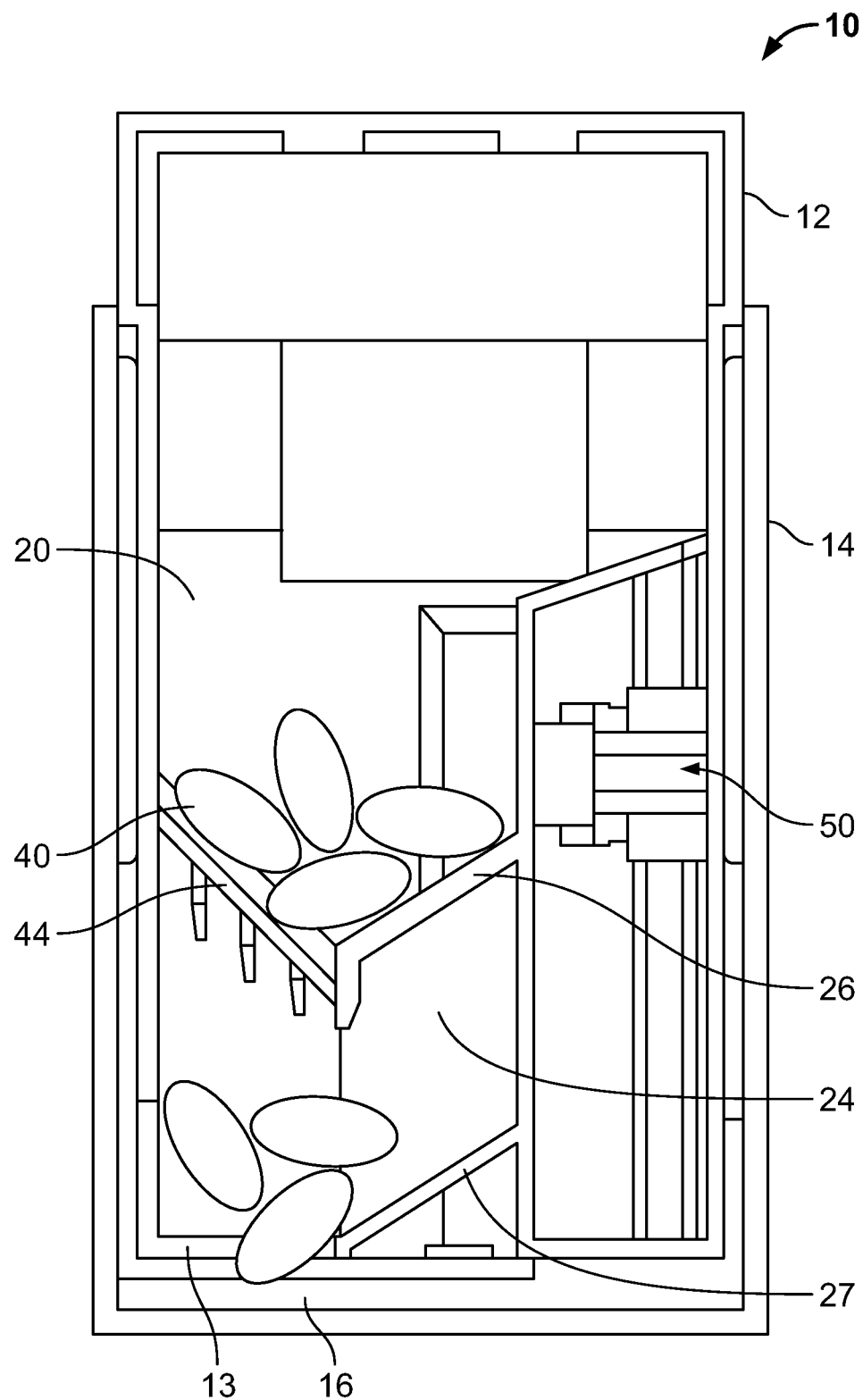
Figure 8:
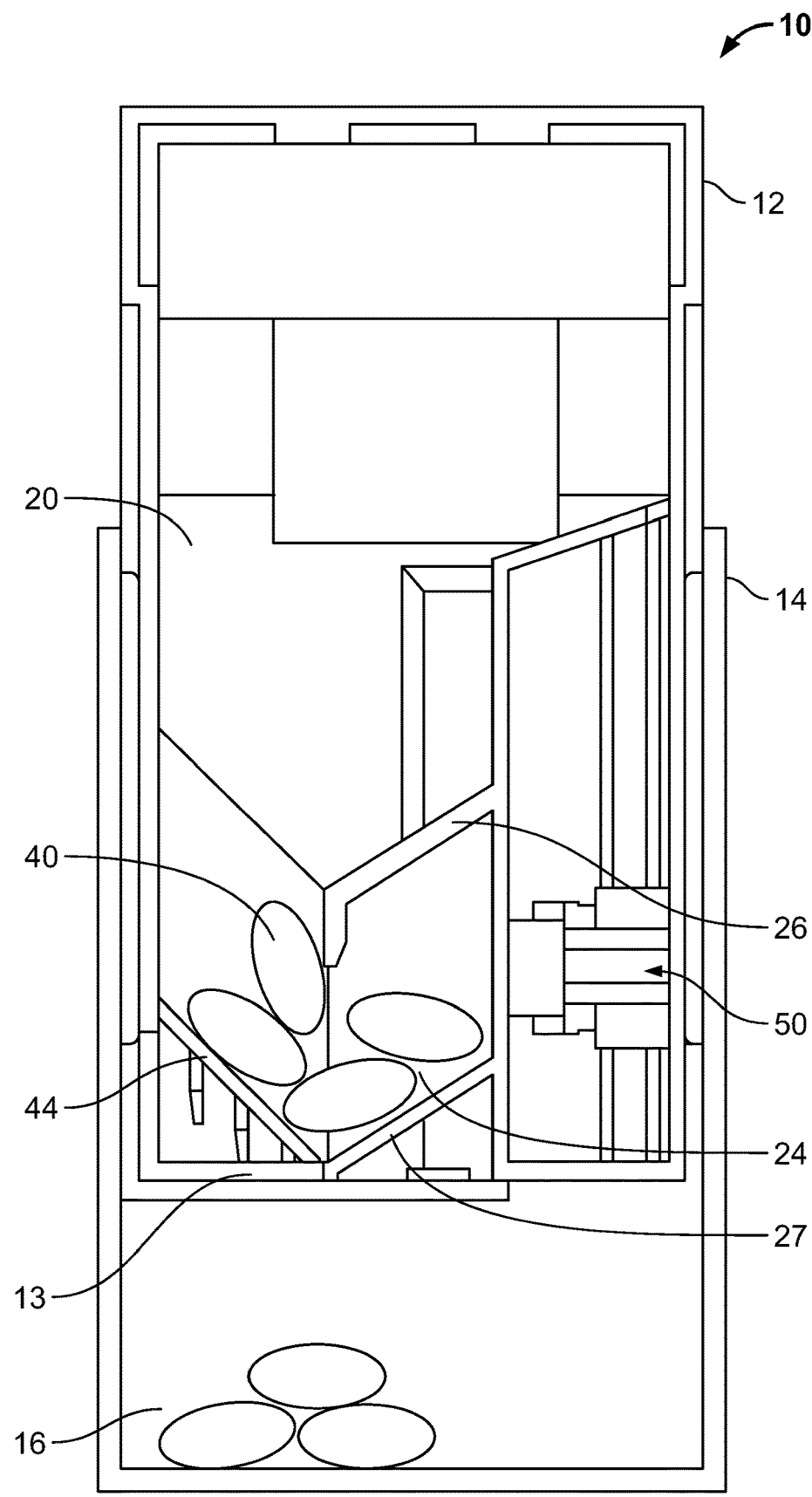

Embodiments of the invention will now be described, by way of example, with reference to the accompanying drawings, in which:

FIG. 1 schematically shows a perspective view of the dispenser;

FIG. 2 schematically shows a cross-sectional view of the dispenser of FIG. 1 in a loading configuration;

FIG. 3 schematically shows an exploded view of the dispenser;

FIG. 4 schematically shows a cross-sectional view of the dispenser of FIG. 1 in a dispensing configuration;

FIG. 5 schematically shows a perspective view of a second dispenser;

FIG. 6 schematically shows a cross-sectional view of the dispenser of FIG. 5 in a loading configuration;

FIG. 7 schematically shows a cross-sectional view of the dispenser of FIG. 5 in a dispensing configuration; and FIG. 8 schematically shows a cross-sectional view of the dispenser of FIG. 5 returned to a loading configuration.

FIG. 1 shows a dispenser 10 for dispensing small product objects. It the following description it will be described that the dispenser is a confectionery dispenser 10 for dispensing pieces of confectionery, such as chocolate lentils (pieces) or candy pieces. However, it should be appreciated that the dispenser could be for dispensing any type of small object such as confectionery pieces, candy pieces, chocolate pieces, pills, or tablets.

As shown in FIG. 1, the dispenser 10 is generally cylindrical and comprises a main container 12 that is located within a secondary container 14. The main container 12 defines a main chamber for storing pieces of confectionery and the secondary container 14 defines an access opening 18 which permits access to a dispensing tray 16 located within the secondary container. In this arrangement the dispensing tray 16 is removable from the secondary container 14 through the access opening 18. However, in other arrangements the dispensing tray 16 could be defined by the base of the secondary container 14, or it could be integrally formed or permanently attached to the secondary container 14. As will be described in detail below, the main container 12 can be moved linearly (axially) with respect to the secondary container 14 between a loading configuration and a dispensing configuration in which a portion of confectionery (which comprises plural confectionery pieces) is dispensed onto the dispensing tray 16. A user can then pick-up and consume confectionery pieces from the dispensing tray 16.

Referring now to FIGS. 2 and 3, the main container 12 has a hollow interior which defines a main chamber 20 for storing a plurality of pieces of confectionery 40. The upper end of the main container 12 is open and is closable with a removable lid 22, and the lower end of the main container 12 defines an outlet 13. The lid 22 can be removed such that the main chamber 20 can be refilled with confectionery. It should be appreciated that in other arrangements the dispenser 10 may be non-refillable. An inner sleeve 11, which is in the form of a tube, is located within the main container 12 and is located towards the bottom. The inner sleeve 11 is axially and rotationally secured to the main container 12 and is secured to the main container 12 by a threaded annular member 15 which is located within the outlet 13 and which is threadedly engaged with the bottom of the inner sleeve 11. The inner sleeve 11 and annular member 15 define a collection chamber 24 which is located at the bottom of the main chamber 20. The collection chamber 24 is dimensioned to receive a set portion size of confectionery comprising a plurality of pieces of confectionery. The inner sleeve 11 comprises guide elements 26 which are configured and oriented to guide a plurality of pieces of confectionery into the collection chamber 24 when the dispenser 10 is in the vertical orientation shown in FIG. 2. The annular member 15 comprises a guide element 27, which also defines the bottom of the collection chamber 24, is arranged to guide confectionery pieces out of the collection chamber 24 through the outlet 13.

The secondary container 14 comprises a base 28 which defines the base of the dispenser. The dispensing tray 16 is located within the secondary container 14 towards the bottom and, as described above, is accessible through an access opening 18. The upper section 30 of the secondary container 14 is dimensioned so as it can receive the main container 12. A collar member 32 is located within the secondary container 14 such that it is located between the secondary container 14 and the main container 12. The collar member 32 is axially and rotationally fixed with respect to the secondary container 14. The collar member 32 could be fixed using any suitable method, and in some arrangements it could be part of the secondary container 14. The collar member 32 comprises three slots 34 that are circumferentially distributed around the inner periphery. The function of these slots 34 will be described in detail below.

The dispenser 10 also comprises a gate member 36 which is annular and which is located around the inner sleeve 11 between the inner sleeve 11 and the main container 12. The gate member 36 comprises three circumferentially distributed and radially projecting tabs 38 that pass through corresponding axially extending slots 42 in the wall of the main container 12. The tabs 38 are located within the corresponding slots 34 and abut the bottom of the slots 34. The gate member 36 further comprises at least one gate element 44 which projects radially inwards and which passes through a corresponding axially extending slot or slots 46 into the interior of the inner sleeve 11 in the region of the collection chamber 24.

Due to the arrangement described above, the gate member 36 is axially and radially fixed with respect to the collar member 32 and the secondary container 14. The main container 12 and inner sleeve 11 are also axially and radially fixed with respect to one another, but can axially (linearly) move together with respect to the secondary container 14, collar member 32 and the gate member 36. As the main container 12 is linearly moved with respect to the secondary container 14, the tabs 38 slide within the slots 42, and the gate element 44 slides within the slot 46. The main container 12 can linearly move between a loading configuration (FIG. 2) in which the gate element 44 closes the bottom of the collection chamber 24 from the outlet 13, and a dispensing configuration in which the bottom of the collection chamber 24 is open, but the gate element 44 divides or separates the main chamber 20 from the collection chamber 24. A coil spring 48 is located around the inner sleeve 11 and the gate member 36 and is within the main container 12. The coil spring 48 acts between the gate member 36 and the top of the inner sleeve 11 which is fixed to the main container 12 and biases the main container 12 to the loading configuration shown in FIG. 2.

In use, the main chamber 20 of the main container 12 is filled with pieces of confectionery 40 such as chocolate lentils or the like. The main container 12 is biased to the loading configuration by the spring 48 (FIG. 2) and therefore the gate element 44 of the gate member 36 closes the bottom of the collection chamber 24. In the loading configuration, the main chamber 20 and the collection chamber 24 are in communication with one another, and therefore a portion of confectionery comprising a plurality of pieces of confectionery 40 fall under gravity and collect within the collection chamber 24. The confectionery pieces 40 are guided into the collection chamber 24 by the guides 26. The gate element 44 prevents any confectionery pieces from leaving the collection chamber 24.

In order to dispense a portion of confectionery pieces, the lid 22 of the main container 12 is pushed downwards. This moves the main container 12 (together with the inner sleeve member 11) axially downwards against the force of the spring 48 with respect to the secondary container 14 and the gate member 36 to the dispensing configuration shown in FIG. 4. The collection chamber 24 defined by the main container 12 and the inner sleeve member 11 thus moves with respect to the gate element 44 and carries with it the portion of confectionery pieces 40 within the collection chamber 24. In the dispensing configuration, the gate element 44 no longer closes the bottom of the collection chamber 24 (i.e. the outlet of the collection chamber 24 is open) and thus the confectionery pieces slide down the guide 27 and through the outlet 13 of the main container 12 onto the dispensing tray 16. A defined portion of confectionery is therefore dispensed and can be consumed by the user. Since in the dispensing configuration the gate element 44 separates or divides the main chamber 20 from the collection chamber 24 (i.e. it closes the opening/inlet to the collection chamber 24) confectionery pieces cannot collect within the collection chamber 24 and pass through the outlet 13. The gate element 44 therefore always separates the main chamber 20 from the outlet 13, and only a single defined portion of confectionery pieces can be shuttled by the collection chamber 24 from the main chamber 20 to the outlet 13. Since the main container 12 is biased to the loading configuration, as soon as the user removes external force from the lid 22 the main container 12 returns to the loading configuration of FIG. 2 and confectionery once again collects within the collection chamber 24.

FIG. 5 shows a second dispenser 10 which is similar to the dispenser described above with reference to FIGS. 1-4. For ease of reference, like parts have been provided with the same reference numerals. As shown in FIG. 5, the dispenser 10 comprises a generally cuboidal main container 12 located within and linearly moveable with respect to an outer secondary container 14. The outer secondary container 14 is generally cuboidal and has an open front, defining an access opening 18, and an open upper end. As will be described, the lower inner surface of the outer secondary container 14 defines a dispensing tray 16. As for the dispenser described above, the main container 12 can be moved linearly with respect to the outer secondary container 14 between a loading configuration and a dispensing configuration in which a portion of confectionery (which comprises plural confectionery pieces) is dispensed onto the dispensing tray 16.

Referring to FIG. 6, the main container 12 defines a main chamber 20 for storing pieces of confectionery 40. The main container 12 comprises a hinged lid 22 which can be open and closed to permit refill of the chamber 20. The lower end of the main container 12 defines an outlet 13 for dispensing confectionery. The main container 12 also defines a collection chamber 24 towards the bottom thereof. The collection chamber 24 is defined by upper and lower sloped guide elements 26, 27. The collection chamber 24 is dimensioned to receive a set portion size of confectionery comprising a plurality of pieces of confectionery. The upper guide element 26 is configured to guide a plurality of pieces of confectionery into the collection chamber 24 when the dispenser 10 is in the vertical orientation shown in FIG. 6. The lower guide element 27, which also defines the bottom of the collection chamber 24, is arranged to guide confectionery pieces out of the collection chamber 24 through the outlet 13. The dispenser 10 also comprises a gate element 44 which is attached to, and in this arrangement integrally formed with, the outer secondary container 14. The gate element 44 projects into the main chamber through a slot 45 in the rear wall of the main container 12. The gate element 44 is in the form of a sloped guide element and in the loading configuration guides a plurality of pieces of confectionery into the collection chamber 24 when the dispenser 10 is in the vertical orientation shown in FIG. 6.

The main container 12 can linearly move between a loading configuration (FIG. 6) in which the gate element 44 closes the bottom of the collection chamber 24 from the outlet 13, and a dispensing configuration in which the bottom of the collection chamber 24 is open, but the gate element 44 divides or separates the main chamber 20 from the collection chamber 24. A coil spring (not shown) is located between the main container 12 and the secondary outer container 14 and biases the main container 12 to the loading configuration shown in FIG. 6. The dispenser 10 is also provided with a locking mechanism 50 which is operable to lock the dispenser in the dispensing configuration.

In use, the main chamber 20 of the main container 12 is filled with pieces of confectionery 40 such as chocolate lentils or the like. The main container 12 is biased to the loading configuration by the spring (FIG. 6) and therefore the gate element 44 closes the bottom of the collection chamber 24. In the loading configuration, the main chamber 20 and the collection chamber 24 are in communication with one another, and therefore a portion of confectionery comprising a plurality of pieces of confectionery 40 fall under gravity and collect within the collection chamber 24. The confectionery pieces 40 are guided into the collection chamber 24 by the guides 26, 44. The gate element 44 prevents any confectionery pieces from leaving the collection chamber 24.

In order to dispense a portion of confectionery pieces, the main container 12 is pushed downwards. This moves the main container 12 linearly downwards against the force of the spring with respect to the secondary container 14 and the gate member 36 to the dispensing configuration shown in FIG. 7. The collection chamber 24 thus moves with respect to the gate element 44 and carries with it the portion of confectionery pieces 40. In the dispensing configuration, the gate element 44 no longer closes the bottom of the collection chamber 24 and thus the confectionery pieces slide down the guide 27 and through the outlet 13 of the main container 12 onto the dispensing tray 16. A defined portion of confectionery is therefore dispensed and can be consumed by the user. Since in the dispensing configuration the gate element 44 separates or divides the main chamber 20 from the collection chamber 24 confectionery pieces cannot collect within the collection chamber 24 and pass through the outlet 13. Since the main container 12 is biased to the loading configuration, as soon as the user removes external force from the lid 22 the main container 12 returns to the loading configuration (FIG. 8) and confectionery once again collects within the collection chamber 24.

Although it has been described that the main container 12 is moved to dispense confectionery, it other arrangements the gate member 36 could be moved by the user to dispense confectionery. Further, it is not essential that a dispensing tray 16 is provided as in other arrangements confectionery, or other small objects, could be dispensed onto a plate or a user's hand, for example.

It should be appreciated that the dimensions and/or geometry of various components of the dispenser 10 are chosen based on the dimensions of the product objects, such as pieces of confectionery, to be dispenser.

The invention claimed is:
1. A dispenser for dispensing product objects, comprising:
a main chamber for storing product objects; and
a portion dispensing mechanism comprising (1) a gate arrangement that further comprises at least one gate element and (2) a collection chamber which are configured for relative linear movement between:
a loading configuration in which in use a portion comprising a plurality of product objects collects within the collection chamber and the gate element prevents the portion from being dispensed from the collection chamber; and
a dispensing configuration in which in use the collection chamber has moved linearly relative to the gate arrangement, and as a result the gate element prevents product objects within the main chamber from entering the collection chamber and the entire portion is dispensed from the collection chamber.
2. A dispenser according to claim 1, wherein the dispenser is for dispensing product objects such as confectionery pieces, candy pieces, chocolate pieces, pills, or tablets.
3. A dispenser according to claim 1, wherein the portion dispensing mechanism is lockable in the loading configuration and/or the dispensing configuration.
4. A dispenser according to claim 1, wherein an outlet guide is provided for guiding product objects out of the collection chamber when the portion dispensing mechanism is in the dispensing configuration.
5. A dispenser according to claim 1, wherein the gate arrangement comprises a single gate element.
6. A dispenser according to claim 1, further comprising a dispensing tray for receiving product objects dispensed from the collection chamber.
7. A dispenser according to claim 1, further comprising a main container which defines the main chamber and the collection chamber, and wherein the main container is linearly moveable with respect to the gate arrangement so as to move the portion dispensing mechanism between the loading configuration and the dispensing configuration.
8. A dispenser according to claim 7, wherein the main container defines a dispensing outlet through which product objects from the collection chamber can be dispensed.
9. A dispenser according to claim 7, further comprising a secondary container within which a dispensing tray for receiving product objects dispensed from the collection chamber is provided, wherein the main container is coupled to and linearly moveable with respect to the secondary container so as to move the portion dispensing mechanism between the loading configuration and the dispensing configuration.
10. A dispenser according to claim 9, wherein the secondary container defines a dispensing chamber, and wherein an access opening is provided in the secondary container which permits access to the dispensing tray.
11. A dispenser according to claim 9, wherein the main container is at least partly received within and is linearly moveable within the secondary container.
12. A dispenser according to claim 9, wherein the secondary container defines a base of the dispenser.
13. A dispenser according to claim 9, wherein the gate arrangement is coupled to the secondary container.
14. A dispenser according to claim 13, wherein the gate arrangement is fixed to or integrally formed with the secondary container.

15. A dispenser according to claim 1, wherein an inlet guide is provided for guiding product objects into the collection chamber when the portion dispensing mechanism is in the loading configuration.
16. A dispenser according to claim 15, wherein at least a part of the gate arrangement forms the inlet guide.
17. A dispenser according to claim 1, wherein the portion dispensing mechanism is resiliently biased to the loading configuration.
18. A dispenser according to claim 17, wherein the portion dispensing mechanism is resiliently biased to the loading configuration with a spring such as a coil spring.
19. A dispenser according to claim 1, wherein the main chamber is provided with a loading opening so that product objects can be loaded into the main chamber.
20. A dispenser according to claim 19, further comprising a closure member for closing the loading opening.
21. A confectionery dispenser for dispensing a plurality of pieces of confectionery, comprising:
a main container defining a main chamber for storing pieces of confectionery, a collection chamber for receiving a plurality of pieces of confectionery and a dispensing outlet for dispensing pieces of confectionery;
a secondary container having a removable dispensing tray located therein for receiving pieces of confectionery dispensed through the dispensing outlet;
a gate arrangement fixed with respect to the secondary container and comprising at least one gate element;
wherein the main container is at least partly received within the secondary container and is linearly moveable with respect to the secondary container between:
a loading position in which in use a plurality of pieces of confectionery collect within the collection chamber and are prevented from being dispensed through the dispensing outlet by the gate arrangement; and
a dispensing position in which in use a plurality of pieces of confectionery are dispensed from the collection chamber through the dispensing outlet and pieces of confectionery are prevented from entering the collection chamber from the main chamber by the gate arrangement; and
a biasing element which resiliently biases the main container to the loading position.
22. A dispenser for dispensing product objects, comprising:
a main chamber for storing product objects; and
a portion dispensing mechanism for dispensing a portion comprising a plurality of product objects, the portion dispensing mechanism comprising a gate arrangement and a collection chamber which are configured for relative linear movement between:
a loading configuration in which in use a plurality of product objects within the main chamber collect within the collection chamber and the gate arrangement prevents product objects from being dispensed from the collection chamber; and
a dispensing configuration in which in use the gate arrangement prevents product objects within the main chamber from entering the collection chamber and a plurality of product objects are dispensed from the collection chamber;
a main container which defines the main chamber and the collection chamber, and wherein the main container is linearly moveable with respect to the gate arrangement so as to move the portion dispensing mechanism between the loading configuration and the dispensing configuration; and a secondary container within which a dispensing tray for receiving product objects dispensed from the collection chamber is provided, wherein the main container is coupled to and linearly moveable with respect to the secondary container so as to move the portion dispensing mechanism between the loading configuration and the dispensing configuration.

23. A dispenser according to claim 22, wherein the secondary container defines a dispensing chamber, and wherein an access opening is provided in the secondary container which permits access to the dispensing tray.

24. A dispenser according to claim 22, wherein the main container is at least partly received within and is linearly moveable within the secondary container.

25. A dispenser according to claim 22, wherein the secondary container defines a base of the dispenser.

26. A dispenser according to claim 22, wherein the gate arrangement is coupled to the secondary container.

27. A dispenser according to claim 26, wherein the gate arrangement is fixed to or integrally formed with the secondary container.

28. A dispenser for dispensing product objects, comprising:
　a main chamber for storing product objects; and
　a portion dispensing mechanism for dispensing a portion comprising a plurality of product objects, the portion dispensing mechanism comprising a gate arrangement and a collection chamber which are configured for relative linear movement between:
　　a loading configuration in which in use a plurality of product objects within the main chamber collect within the collection chamber and the gate arrangement prevents product objects from being dispensed from the collection chamber; and
　　a dispensing configuration in which in use the gate arrangement prevents product objects within the main chamber from entering the collection chamber and a plurality of product objects are dispensed from the collection chamber;
　wherein an inlet guide is provided for guiding product objects into the collection chamber when the portion dispensing mechanism is in the loading configuration, and wherein at least a part of the gate arrangement forms the inlet guide.

29. A dispenser for dispensing product objects, comprising:
　a main chamber for storing product objects; and
　a portion dispensing mechanism for dispensing a portion comprising a plurality of product objects, the portion dispensing mechanism comprising a gate arrangement and a collection chamber which are configured for relative linear movement between:
　　a loading configuration in which in use a plurality of product objects within the main chamber collect within the collection chamber and the gate arrangement prevents product objects from being dispensed from the collection chamber; and
　　a dispensing configuration in which in use the gate arrangement prevents product objects within the main chamber from entering the collection chamber and a plurality of product objects are dispensed from the collection chamber;
　wherein the portion dispensing mechanism is lockable in the loading configuration and/or the dispensing configuration.

30. A dispenser for dispensing product objects, comprising:
　a main chamber for storing product objects; and
　a portion dispensing mechanism for dispensing a portion comprising a plurality of product objects, the portion dispensing mechanism comprising a gate arrangement and a collection chamber which are configured for relative linear movement between:
　　a loading configuration in which in use the portion collects within the collection chamber and the gate arrangement prevents the portion from being dispensed from the collection chamber; and
　　a dispensing configuration in which in use the collection chamber has moved linearly relative to the gate arrangement, and as a result the gate arrangement prevents product objects within the main chamber from entering the collection chamber and allows the portion to be dispensed from the collection chamber, and
　wherein the gate arrangement comprises a gate element that closes the bottom of the collection chamber in the loading configuration and separates the main chamber from the collection chamber in the dispensing configuration.

\* \* \* \* \*